No. 748,552. PATENTED DEC. 29, 1903.
W. C. WILLIAMSON.
MEANS FOR ATTACHING BAILS TO BASKETS OR OTHER VESSELS.
APPLICATION FILED FEB. 6, 1903.
NO MODEL.
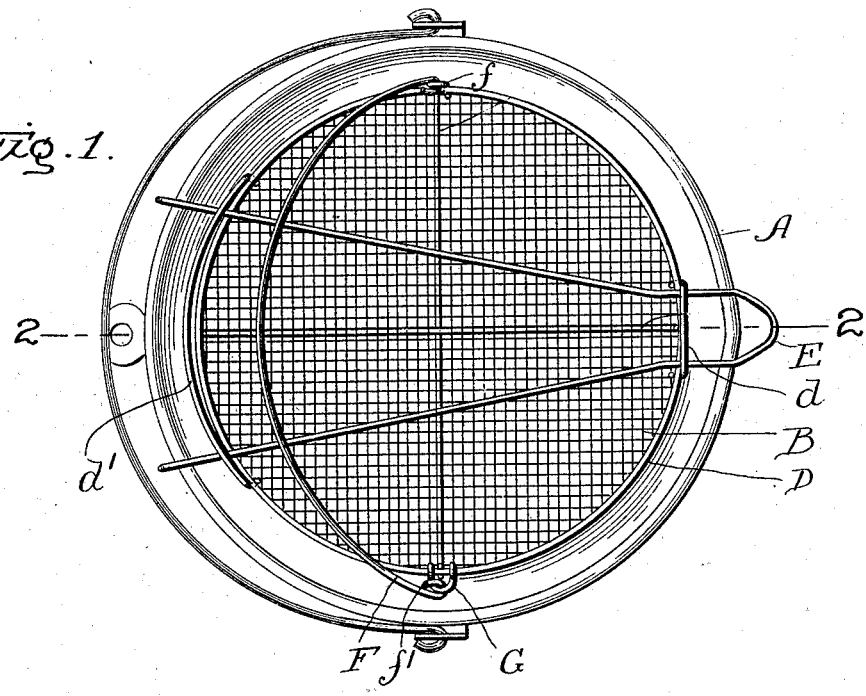
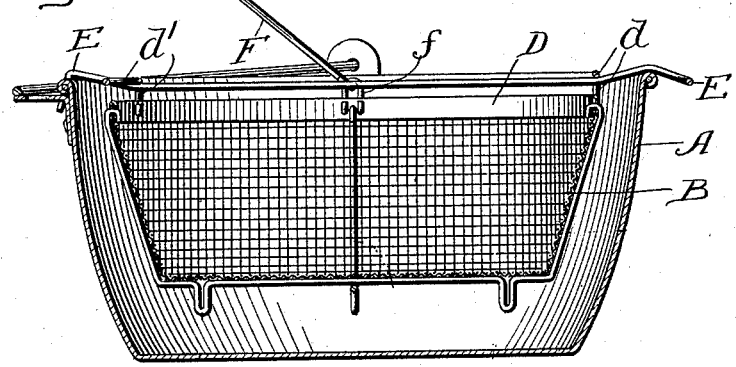
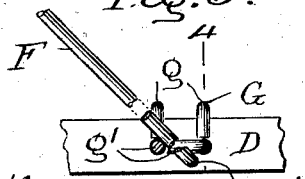
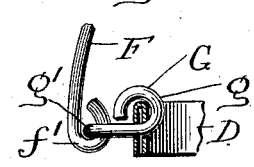
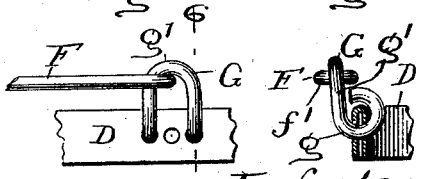
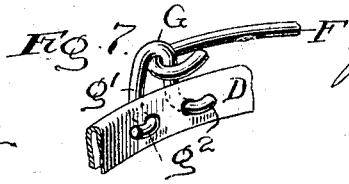
Witnesses:
Russell Wiles
Chas. O. Shervey
Inventor:
William C. Williamson
by H. Bitner
Atty.

No. 748,552.

Patented December 29, 1903.

UNITED STATES PATENT OFFICE.

WILLIAM C. WILLIAMSON, OF CHICAGO, ILLINOIS.

MEANS FOR ATTACHING BAILS TO BASKETS OR OTHER VESSELS.

SPECIFICATION forming part of Letters Patent No. 748,552, dated December 29, 1903.

Application filed February 6, 1903. Serial No. 142,147. (No model.)

*To all whom it may concern:*

Be it known that I, WILLIAM C. WILLIAMSON, a citizen of the United States of America, and a resident of Chicago, in the county of Cook and State of Illinois, have invented certain new and useful Improvements in Cooking Utensils, of which the following is a specification.

My invention relates to certain new and useful improvements in means for attaching bails to baskets or other vessels; and its object is to produce a device of this class for use in various connections, which will presently be explained.

To this end my invention consists in certain novel features of construction, which are fully illustrated in the accompanying drawings and described in this specification.

In the aforesaid drawings, Figure 1 is a top plan of my improved device. Fig. 2 is a vertical section in the line 2 2 of Fig. 1. Fig. 3 is an elevation of the device used for connecting one end of the bail of the wire basket to said basket with certain parts broken away. Fig. 4 is a section in the line 4 4 of Fig. 3. Fig. 5 is a view similar to Fig. 3, but showing the parts in a different position. Fig. 6 is a section in line 6 6 of Fig. 5, and Fig. 7 is a perspective of a modified form of said connecting device.

Referring to the drawings, A is a kettle of ordinary construction.

B is a basket composed of wire-net after the general form of wire baskets, which are used for various purposes, and especially for cooking potatoes, vegetables, &c., or for cooking in boiling lard.

About the top of the basket B extends a sheet-metal rim D, to which are secured two low flat bails $d$ $d'$, the bail $d$ being of less circumferential extent than the bail $d'$. These bails are adapted to receive a loop of wire E, which can be placed under them and across the rim of the kettle, as shown in the drawings, and so support the basket well up from the bottom of the kettle A.

F represents the bail of the basket B, said bail being secured at one end to the basket by an ordinary wire ear $f$, secured to the sheet-metal rim D. The opposite end of the bail is secured by means of an ear G, the eye made in the bail F for this purpose being indicated in the drawings by $f'$. The ear G is composed of two loops $g$, which extend through the rim of the basket, and the larger loop $g'$ connecting these two smaller loops, said loop $g'$ passing through the eye $f'$. The whole ear G can be rotated in a vertical plane about that portion of the rim of the basket which is included within the loops $g$, the plane of the loop $g'$ swinging from a vertical plane, as shown in Figs. 5 and 6, to a horizontal plane, as shown in Figs. 3 and 4. The particular advantage of this construction lies in the fact that when the loop $g'$ of the ear G lies in a horizontal plane the bail F of the basket is held up by engagement of the loop $f'$ of said bail with the loop $g'$ of the ear, its position under those circumstances being indicated in Figs. 1 and 2. When, however, it is desired to let the bail fall down against the rim of the basket, the loop $g'$ is swung up to the position shown in Fig. 5, in which case the bail F can swing up and down as can the bail of any ordinary kettle or pail. This is a particularly desirable feature, for the reason that when the basket is very hot it is desirable that the bail be left standing, so that the basket can be removed without getting the hand into contact with the rim. When, on the other hand, it is desired to pack the basket away, it is extremely undesirable to have the bail sticking up. This particular type of ear, which permits the bail to assume both positions, is therefore advantageous.

The modification of the ear G shown in Fig. 7 is similar in every way to that shown in the other figures except that instead of being secured in the rim D by the loops $g$ it is secured by two ends $g^2$, forming extensions of the loop $g'$, which are turned outwardly after being passed through suitable holes in said rim D.

It will be noted that by providing the basket with the bail it will be readily removable, thereby avoiding the necessity of pouring off the water, as is the usual custom after potatoes and the like have been boiled. The basket and its contents may simply be withdrawn from the kettle.

I realize that considerable variation can be made in the details of the above device without departing from the spirit of the invention, and I do not, therefore, desire to limit myself to the particular construction shown and described except as pointed out in the claims.

I claim as new and desire to secure by Letters Patent—

1. In a device of the class described, the combination with a bail and means for securing it at one end to the rim of the article to be lifted thereby, of an eye in the opposite end of said bail and in the plane of the bail and a perforate ear engaging with said eye, pivotally attached to the rim of the article to be lifted at a point diametrically opposite to the point of attachment of the first-mentioned end of said bail, said ear being rotatable in a vertical plane.

2. In a device of the class described, the combination with a bail and means for securing it at one end to the rim of the article to be lifted thereby, of an eye in the opposite end of said bail in the plane of the bail, an ear engaging with said eye, composed of a wire loop having its ends extending through the rim of the article to be lifted, and curved within said rim to prevent the removal of said ear, and said ear being rotatable in a vertical plane.

3. In a device of the class described, the combination with a bail and means for securing it at one end to the rim of the article to be lifted thereby, of a loop composed of a wire ear in engagement with an eye in said bail and in the plane thereof, said ear having two loops bent about a portion of the rim of the article to be lifted and said ear being rotatable in a vertical plane.

In witness whereof I have signed the above application for Letters Patent, at Chicago, in the county of Cook and State of Illinois, this 31st day of January, A. D. 1903.

WILLIAM C. WILLIAMSON.

Witnesses:
CHAS. O. SHERVEY,
RUSSELL WILES.